US011977566B2

(12) United States Patent
Kaneko et al.

(10) Patent No.: US 11,977,566 B2
(45) Date of Patent: May 7, 2024

(54) INFORMATION PROCESSING APPARATUS, INFORMATION PROCESSING METHOD, AND INFORMATION PROCESSING PROGRAM

(71) Applicant: FUJIFILM CORPORATION, Tokyo (JP)

(72) Inventors: Yasuhisa Kaneko, Tokyo (JP); Nobuya Kitamura, Tokyo (JP); Tomohide Hiragami, Tokyo (JP); Yasuyuki Hosono, Tokyo (JP); Kenji Nagamiya, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/167,088

(22) Filed: Feb. 10, 2023

(65) Prior Publication Data
US 2023/0259538 A1    Aug. 17, 2023

(30) Foreign Application Priority Data
Feb. 16, 2022    (JP) .................................. 2022-022500

(51) Int. Cl.
*G06F 16/332*    (2019.01)
*G06F 16/957*    (2019.01)

(52) U.S. Cl.
CPC ........ *G06F 16/3325* (2019.01); *G06F 16/957* (2019.01)

(58) Field of Classification Search
CPC . G06F 16/3325; G06F 16/957; G06F 16/9535
See application file for complete search history.

(56) References Cited

U.S. PATENT DOCUMENTS

| 8,024,329 | B1* | 9/2011 | Rennison | ............... | G06N 20/00 |
| | | | | | 707/723 |
| 2003/0004939 | A1* | 1/2003 | Yamaguchi | ............ | G16B 25/00 |
| 2005/0060379 | A1* | 3/2005 | Torii | ..................... | G06Q 30/08 |
| | | | | | 709/206 |
| 2019/0140988 | A1* | 5/2019 | Snider | .................... | G06N 20/20 |

FOREIGN PATENT DOCUMENTS

JP        2007-172375 A    7/2007

* cited by examiner

*Primary Examiner* — Kuen S Lu
(74) *Attorney, Agent, or Firm* — SOLARIS Intellectual Property Group, PLLC

(57) ABSTRACT

An information processing apparatus includes at least one processor, in which the processor receives a search objective target selected as a search objective from among a plurality of objective targets which are objective target subjects or objective target objects capable of being the search objective, receives a search condition designated for the search objective target, outputs a search result obtained by searching for a search target based on the search condition, and accumulates the search condition used for a search performed as the search objective target, as a search history, for each of the plurality of objective targets.

11 Claims, 17 Drawing Sheets

| TARGET SUBJECT NAME | ICON | SEARCH HISTORY |
|---|---|---|
| A | 😊 | "TRAVEL DESTINATION HOT SPRING" "MATCH RESULT BASEBALL" |
| B | 😊 | "LUNCH ITALIAN FOOD" "PRESENT FLOWER" "LUNCH" |
| C | 😊 | "LUNCH CHINESE FOOD" "DRIVE" "LUNCH" |
| D | 😊 | "HOSPITAL" "DAY CARE" |
| E | 🐱 | "TRIMMING" "DOG RUN" |

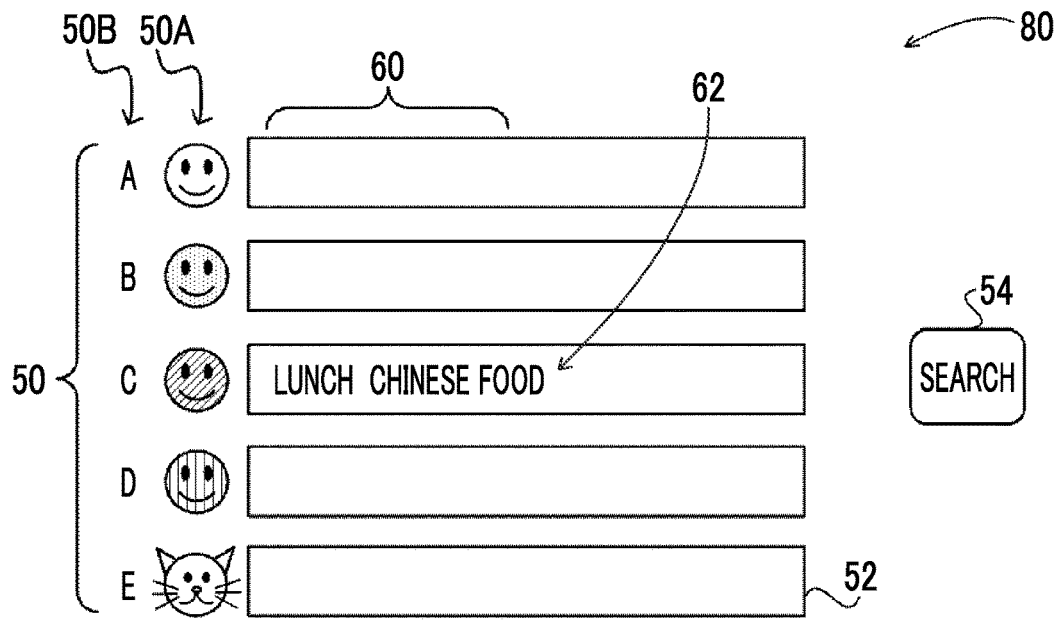

"LUNCH" "ITALIAN FOOD"

| TARGET SUBJECT NAME | ICON | SEARCH HISTORY |
|---|---|---|
| A | ☺ | |
| B | ☺ | "LUNCH ITALIAN FOOD" "LUNCH" |
| C | ☺ | "LUNCH CHINESE FOOD" |
| D | ☺ | |
| E | 🐱 | |

| TARGET SUBJECT NAME | ICON | SEARCH HISTORY |
|---|---|---|
| A | ☺ | |
| B | ☺ | "LUNCH ITALIAN FOOD" "LUNCH" "LUNCH" |
| C | ◉ | "LUNCH CHINESE FOOD" "LUNCH" "LUNCH" |
| D | ◉ | |
| E | 🐱 | |

FIG. 12A

| TARGET SUBJECT NAME | ICON | ATTRIBUTE INFORMATION ITEM | |
|---|---|---|---|
| A |  | AGE | 40 YEARS OLD |
| | | GENDER | MALE |
| | | OCCUPATION | OFFICE WORKER |
| | | HOBBY | WATCHING BASEBALL |
| | | PHYSICAL INFORMATION | IRREGULAR PULSE |
| | | RELATIONSHIP INFORMATION | (SEE ANOTHER FIGURE) |
| | | OTHERS | SINGLE-FAMILY HOUSE, LIVING WITH WIFE AND CHILD |
| B |  | AGE | 38 YEARS OLD |
| | | GENDER | FEMALE |
| | | OCCUPATION | HOUSEWIFE |
| | | HOBBY | READING BOOK |
| | | PHYSICAL INFORMATION | - |
| | | RELATIONSHIP INFORMATION | (SEE ANOTHER FIGURE) |
| | | OTHERS | SINGLE-FAMILY HOUSE, LIVING WITH HUSBAND AND CHILD |
| C |  | AGE | 12 YEARS OLD |
| | | GENDER | MALE |
| | | OCCUPATION | PRIMARY SCHOOL CHILD |
| | | HOBBY | SOCCER |
| | | PHYSICAL INFORMATION | - |
| | | RELATIONSHIP INFORMATION | (SEE ANOTHER FIGURE) |
| | | OTHERS | SINGLE-FAMILY HOUSE, LIVING WITH PARENTS |
| D |  | AGE | 72 YEARS OLD |
| | | GENDER | FEMALE |
| | | OCCUPATION | JOBLESS |
| | | HOBBY | FANCYWORK |
| | | PHYSICAL INFORMATION | REQUIRING NURSING CARE 2 |
| | | RELATIONSHIP INFORMATION | (SEE ANOTHER FIGURE) |
| | | OTHERS | WIDOW, LIVING ALONE |
| E |  | AGE | 2 YEARS OLD |
| | | GENDER | MALE |
| | | CATEGORY 1 | DOG |
| | | CATEGORY 2 | TOY POODLE |
| | | PHYSICAL INFORMATION | - |
| | | RELATIONSHIP INFORMATION | (SEE ANOTHER FIGURE) |
| | | OTHERS | - |

FIG. 12B

| PARTNER | | PERSON HIMSELF/HERSELF | | | | |
|---|---|---|---|---|---|---|
| | | A | B | C | D | E |
| | A | | HUSBAND | FARTHER | SON | OWNER |
| | B | WIFE | | MOTHER | DAUGHTER-IN-LAW | OWNER |
| | C | SON | SON | | GRANDCHILD | OWNER |
| | D | MOTHER | MOTHER-IN-LAW | GRANDMOTHER | | – |
| | E | PET | PET | PET | – | |

30B

INFORMATION PROCESSING APPARATUS, INFORMATION PROCESSING METHOD, AND INFORMATION PROCESSING PROGRAM

CROSS-REFERENCE TO RELATED APPLICATIONS

This application claims priority from Japanese Application No. 2022-022500, filed on Feb. 16, 2022, the entire disclosure of which is incorporated herein by reference.

BACKGROUND

Technical Field

The present disclosure relates to an information processing apparatus, an information processing method, and an information processing program.

Related Art

In the related art, there is known the technology of searching for a search target based on a search condition designated by a user and presenting a search result to the user. As the technology of obtaining the search result that is appropriate for the user, for example, JP2007-172375A discloses the technology of narrowing down a result obtained by searching a database that accumulates information on a search target in accordance with a classification item set by a user based on an input search condition, and outputting a search result for each classification item.

By the way, in the related art, in a case in which each of a plurality of users inputs the same keyword as the search condition and performs a search, the search results for the keyword are the same. For example, in the technology disclosed in JP2007-172375A, in a case in which each of the plurality of users inputs the same keyword and sets the same classification item, the search results to be output are the same regardless of the user. However, there is a case in which the search result is appropriate for a certain user among the plurality of users and is not appropriate for another user, so that there is a case in which the search accuracy is decreased.

The present disclosure has been made in view of the above circumstances, and is to provide an information processing apparatus, an information processing method, and an information processing program capable of improving the search accuracy as compared with a case in which a search history is not accumulated for each search objective target.

SUMMARY

In order to achieve the object described above, the present disclosure relates to an information processing apparatus comprising at least one processor, in which the processor receives a search objective target selected as a search objective from among a plurality of objective targets which are objective target subjects or objective target objects capable of being the search objective, receives a search condition designated for the search objective target, outputs a search result obtained by searching for a search target based on the search condition, and accumulates the search condition used for a search performed as the search objective target, as a search history, for each of the plurality of objective targets.

In addition, in order to achieve the object described above, the present disclosure relates to an information processing method executed by a processor of an information processing apparatus including at least one processor, the method comprising receiving a search objective target selected as a search objective from among a plurality of objective targets which are objective target subjects or objective target objects capable of being the search objective, receiving a search condition designated for the search objective target, outputting a search result obtained by searching for a search target based on the search condition, and accumulating the search condition used for a search performed as the search objective target, as a search history, for each of the plurality of objective targets.

In addition, in order to achieve the object described above, the present disclosure relates to an information processing program causing a processor of an information processing apparatus including at least one processor to execute receiving a search objective target selected as a search objective from among a plurality of objective targets which are objective target subjects or objective target objects capable of being the search objective, receiving a search condition designated for the search objective target, outputting a search result obtained by searching for a search target based on the search condition, and accumulating the search condition used for a search performed as the search objective target, as a search history, for each of the plurality of objective targets.

According to the present disclosure, the search accuracy can be improved as compared with a case in which the search history is not accumulated for each search objective target.

BRIEF DESCRIPTION OF THE DRAWINGS

FIG. 7B is a diagram for describing a specific example of the action of the information processing apparatus according to the embodiment.

FIG. 12A is a diagram showing an example of an attribute information DB.

FIG. 12B is a diagram for describing relationship information included in the attribute information.

DETAILED DESCRIPTION

In the following, an embodiment of the disclosed technology will be described in detail with reference to the drawings. It should be noted that the present embodiment does not limit the present invention.

Figure 1:
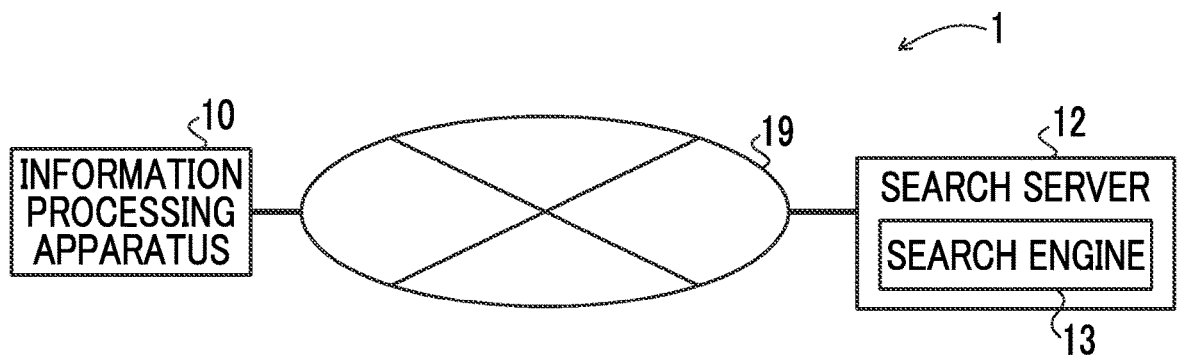
FIG. 1 is a configuration diagram schematically showing an example of an overall configuration of a search system according to an embodiment.

First, an example of an overall configuration of a search system according to the present embodiment will be described. FIG. 1 shows a configuration diagram showing an example of an overall configuration of a search system 1 according to the present embodiment. As shown in FIG. 1, the search system 1 according to the present embodiment comprises an information processing apparatus 10 and a search server 12. The information processing apparatus 10 and the search server 12 are connected to each other via a network 19 by wired communication or wireless communication. The search system 1 is a search system that performs search processing by using the search server 12 (search engine 13) provided in the network 19.

The search server 12 is a so-called server computer or a personal computer, and comprises the search engine 13. As the search engine 13, for example, an existing search engine, such as Yahoo! (registered trademark) or Google (registered trademark), can be used. The search server 12 has a function of providing a search result obtained by performing a search using the search engine 13 in response to a search request of the information processing apparatus 10 to the information processing apparatus 10 via the network 19. Specifically, the search server 12 receives a keyword as the search request from the information processing apparatus 10, and transmits information, such as a title or uniform resource locator (URL) indicating a website including the received keyword, among a plurality of websites (not shown) connected to the network 19 to the information processing apparatus 10, as the search result.

It should be noted that, in FIG. 1, the form has been described in which the search system 1 comprises one search engine 13, but the number of the search engines 13 provided in the search system 1 is not limited to one, and a plurality of search engines 13 may be provided. In this case, a plurality of search servers 12 each of which comprises the search engine 13 may be provided, or one search server 12 may comprise the plurality of search engines 13. In addition, the search server 12 may be restricted so that only a specific related party can access and perform a search by using a user identification (ID), a terminal ID, or the like.

On the other hand, the information processing apparatus 10 according to the present embodiment has a function of performing a search using the search server 12 via the network 19 in response to an instruction from a searcher and outputting the search result acquired from the search server 12. The information processing apparatus 10 may be, for example, a desktop computer, a laptop, a tablet computer, or a mobile terminal apparatus, such as a smartphone. It should be noted that the searcher may be a person to be determined by the information processing apparatus 10, for example, a logged-in user, and the information processing apparatus 10 may determine the searcher by using an ID or a password at the time of activation.

It should be noted that, in FIG. 1, the form has been described in which the search system 1 comprises one information processing apparatus 10, the number of the information processing apparatuses 10 provided in the search system 1 is not limited to one, and a plurality of information processing apparatuses 10 may be provided.

Figure 2:
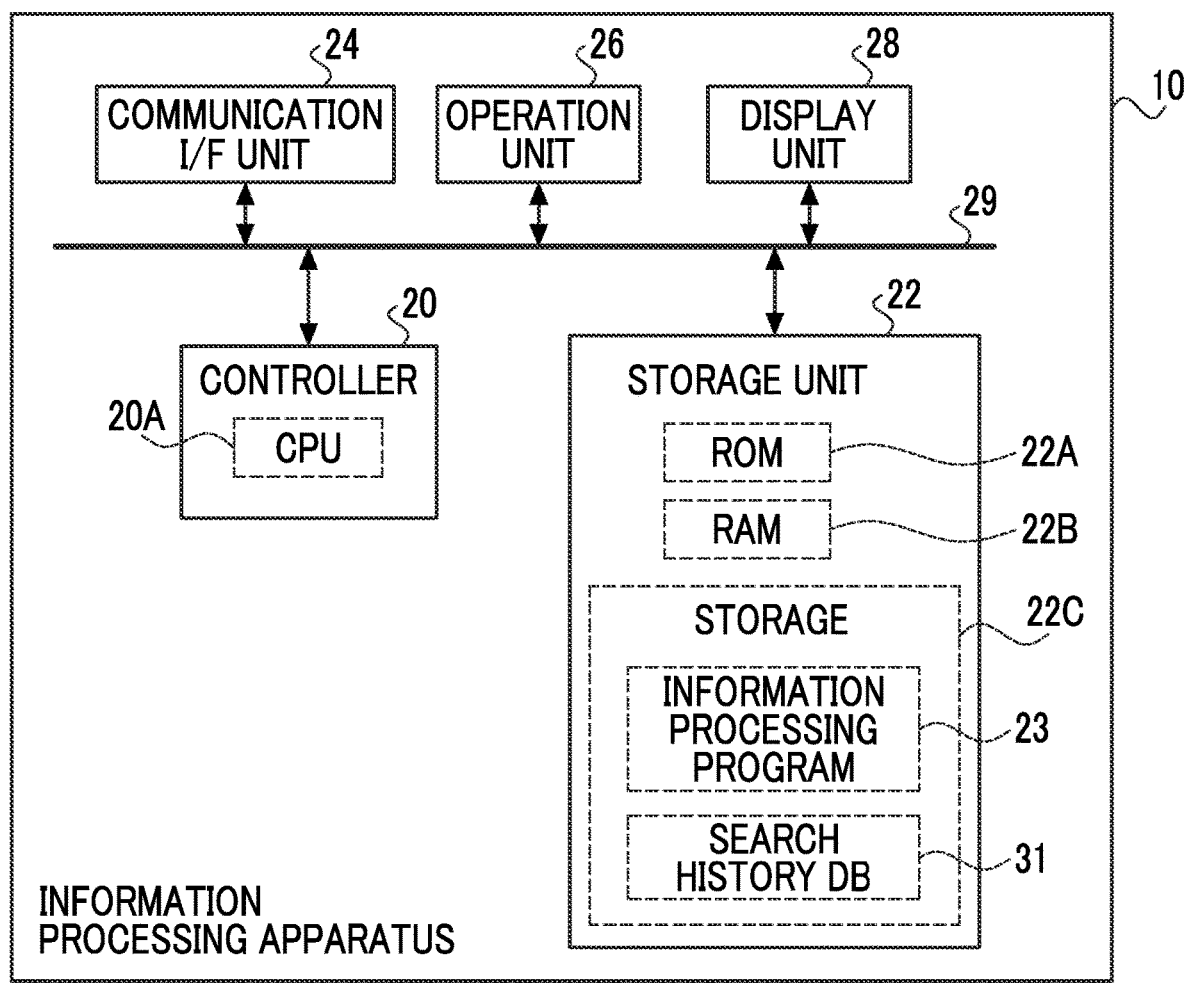
FIG. 2 is a block diagram showing an example of a configuration of an information processing apparatus according to the embodiment.

FIG. 2 is a diagram showing an example of a hardware configuration of the information processing apparatus 10. As shown in FIG. 2, the information processing apparatus 10 comprises a controller 20, a storage unit 22, a communication interface (I/F) unit 24, an operation unit 26, and a display unit 28. The controller 20, the storage unit 22, the communication OF unit 24, the operation unit 26, and the display unit 28 are connected to each other via a bus 29, such as a system bus or a control bus, to allow exchange of various types of information.

The controller 20 according to the present embodiment controls the overall operation of the information processing apparatus 10. The controller 20 is a processor, and comprises a central processing unit (CPU) 20A. In addition, the controller 20 is connected to the storage unit 22 which will be described below.

The operation unit 26 is used for the searcher to input the instruction related to a search, various types of information, or the like. The operation unit 26 is not particularly limited, and examples thereof include various switches, a touch panel, a touch pen, and a mouse. It should be noted that the operation unit 26 may be configured as a voice input device using a microphone or the like. The display unit 28 displays the search result, various types of information, or the like. It should be noted that the operation unit 26 and the display unit 28 may be integrated to form a touch panel display.

The communication OF unit 24 communicates various types of information including the search request, the search result, or the like using the search server 12 and the like via the network 19 by wireless communication or wired communication.

The storage unit 22 stores programs or various data used for the operation of the information processing apparatus 10. The storage unit 22 comprises, for example, a read only memory (ROM) 22A, a random access memory (RAM) 22B, and a storage 22C. Various programs and the like executed by the CPU 20A are stored in advance in the ROM 22A. The RAM 22B transitorily stores various data. The storage 22C stores an information processing program 23 executed by the CPU 20A, a search history database (DB) 31, which will be described in detail below, or various types of other information. The information processing program 23 is a so-called search browser. The storage 22C is a non-volatile storage unit, and examples thereof include a hard disk drive (HDD) or a solid state drive (SSD).

Figure 3:
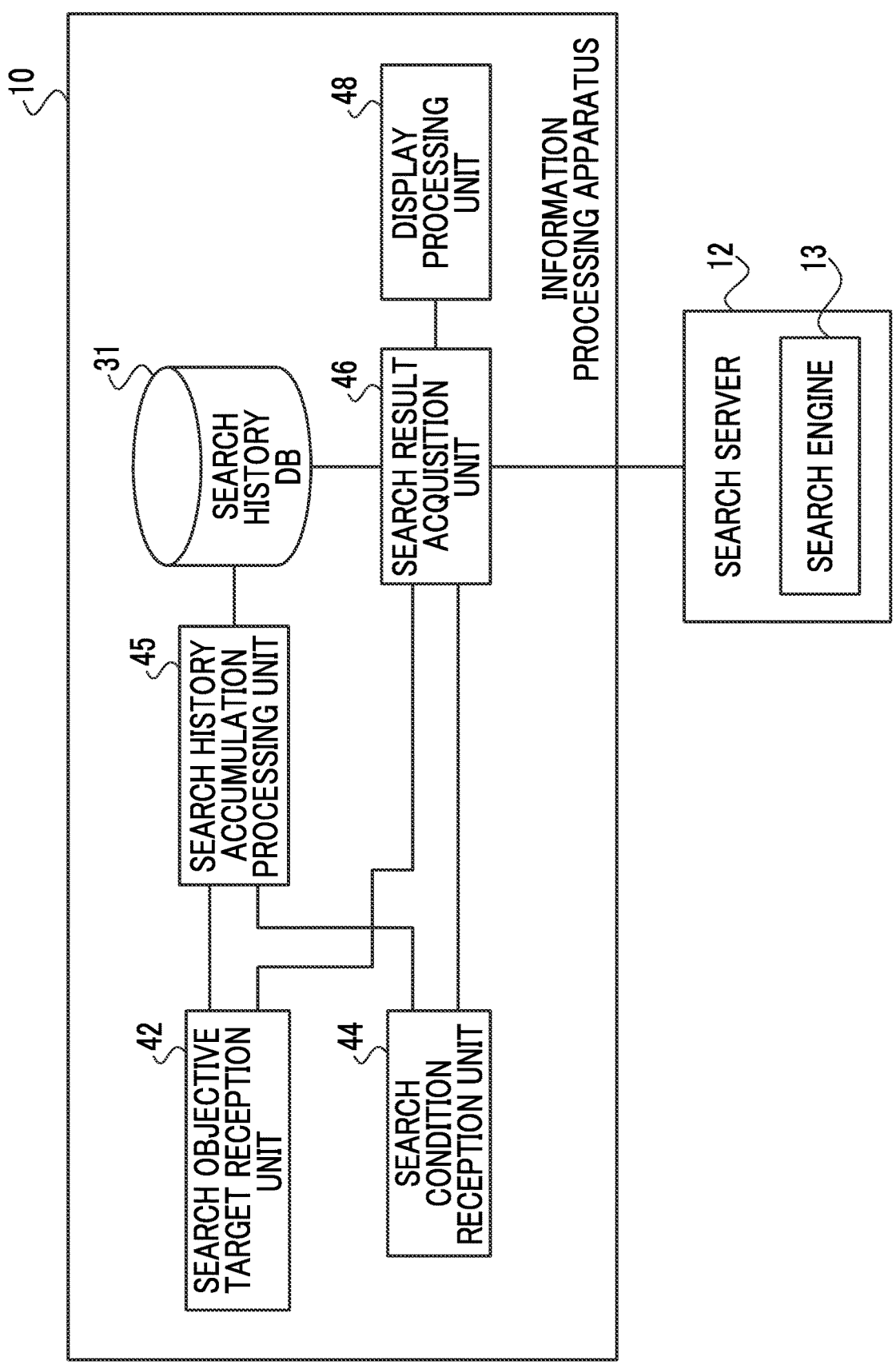
FIG. 3 is a functional block diagram showing an example of a function of the information processing apparatus according to the embodiment.

Further, FIG. 3 shows a functional block diagram of an example of the configuration of the information processing apparatus 10 according to the present embodiment. As shown in FIG. 3, the information processing apparatus 10 comprises a search objective target reception unit 42, a search condition reception unit 44, a search history accumulation processing unit 45, a search result acquisition unit 46, and a display processing unit 48. As an example, in the information processing apparatus 10 according to the present embodiment, the CPU 20A of the controller 20 executes the information processing program 23 stored in the storage 22C, so that the CPU 20A functions as the search objective target reception unit 42, the search condition reception unit 44, the search history accumulation processing unit 45, the search result acquisition unit 46, and the display processing unit 48.

The search objective target reception unit 42 has a function of receiving a target subject selected as a search objective. In the information processing apparatus 10 according to the present embodiment, it is possible to obtain the search result obtained by performing a search based on the search condition received for each specific person. In other words, it is possible to assume the specific person and perform the search for the assumed specific person. In the present embodiment, since the target subject can be the search objective for the specific person assumed in the search, the specific person is referred to as a "target subject". It should be noted that the "target subject" according to the present embodiment is an example of an "objective target subject" according to the present disclosure. In addition, in the present embodiment, the "searcher" is a person who operates the information processing apparatus 10 to perform the search at present, and the "searcher" and the "target subject" may or may not be the same. For example, in a couple, in a case in which, as the "searcher", a husband searches for a lunch destination with a wife, the wife is the "target subject", and thus the "searcher" and the "target subject" are different from each other.

It should be noted that the target which can be the search objective is not limited to a human, and may be various organisms. That is, the information processing apparatus 10 can obtain the search result obtained by assuming a specific organism and performing the search based on the search condition designated for the assumed specific organism. Examples of such a specific organism include various pets, such as a dog, a cat, a rabbit, and a turtle.

In addition, the target which can be the search objective is not limited to the organism, and may be, for example, various groups or various articles. The information processing apparatus 10 can obtain the search result obtained by assuming a specific group or a specific article and performing the search based on the search condition designated for the assumed specific group or specific article. Examples of such a specific group include various enterprises. In addition, the term "group" as used herein includes a non-profit organization (NPO, local government, townspeople association, club, or the like) or a small organization within an enterprise (business division, department, and factory), in addition to a commercial enterprise. In addition, examples of the specific article include various products. In addition, the product may be a facility (amusement park, zoo, or the like) or area (scenic spot, hot spring, or the like) in addition to the specific article, or the organism may be a virtual object (character, avatar, or the like). In the present embodiment, for the sake of simplification of description, the specific person, the specific organism, the specific group, and the specific enterprise are collectively referred to as the "target subject". In addition, in the current search, the target subject which is the search objective is referred to as a "search objective target subject". The search objective target subject according to the present embodiment is an example of a search objective target according to the present disclosure.

Specifically, the search objective target reception unit 42 has a function of displaying target subject identification information 50 indicating the target subject described above in a search screen 80 shown in FIG. 4 as an example, and receiving the search objective target subject which is the current search objective selected by the searcher from among target subjects displays in the target subject identification information 50.

Figures 4, 5:
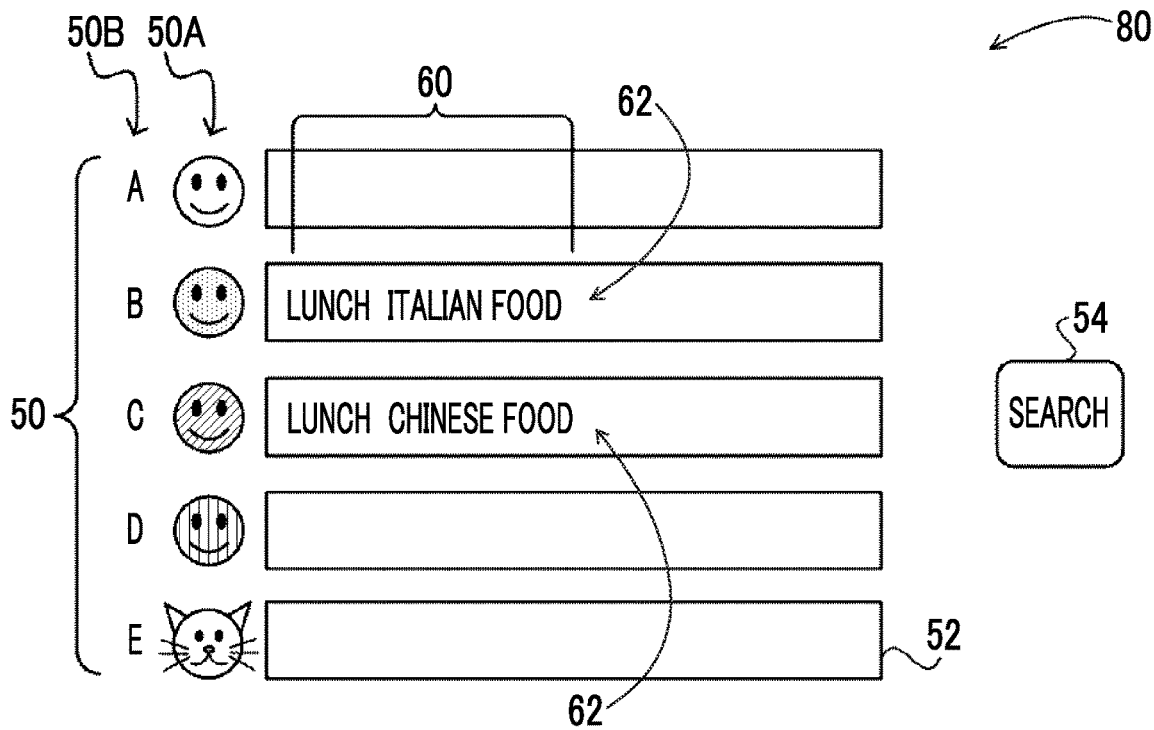
FIG. 4 is a diagram showing an example of a search screen displayed on a display unit of the information processing apparatus according to the embodiment.
FIG. 5 is a diagram showing an example of a search history DB.

FIG. 4 shows an example of the search screen 80 displayed on the display unit 28. As shown in FIG. 4, the search screen 80 includes the target subject identification information 50 for identifying the target subject which can be the search objective, an input field 52, and a search button 54. The target subject identification information 50 includes an icon 50A indicating the target subject and a name 50B indicating a name of the target subject. In addition, as shown in FIG. 4, on the search screen 80, the input field 52 is displayed for each target subject corresponding to the target subject identification information 50. The search objective target reception unit 42 receives the target subject corresponding to the input field 52 in which the keyword is input as the search objective target subject. The search objective target reception unit 42 outputs the received information indicating the search objective target subject to the search history accumulation processing unit 45 and the search result acquisition unit 46.

The search condition reception unit 44 has a function of receiving the search condition designated by the searcher. Specifically, the search condition reception unit 44 has a function of displaying the input field 52 for each target subject on the search screen 80 shown in FIG. 4 as an example, and receiving a keyword 62 input by the searcher to the input field 52 by operating the operation unit 26, as a first search condition 60. The example shown in FIG. 4 shows a state in which the searcher inputs two keywords 62 of "lunch" and "Italian food" as the keyword 62 for a target subject B, and inputs two keywords 62 of "lunch" and "Chinese food" as the keyword 62 for a target subject C. It should be noted that the keyword 62 to be input to the input field 52 is not particularly limited and may be, for example, any of a word or a sentence, and the number of the keywords 62 that can be input to the input field 52 is not particularly limited. The search condition reception unit 44 outputs information indicating the received first search condition 60 to the search history accumulation processing unit 45 and the search result acquisition unit 46.

The search history accumulation processing unit 45 has a function of accumulating, as the search history, the keyword to be used for the search received by the search condition reception unit 44, for each target subject which is the search objective in the search history DB 31, in association with the search target received by the search objective target reception unit 42. In the information processing apparatus 10 according to the present embodiment, the search history in a case in which the specific person is assumed and the search is performed for the assumed specific person can be accumulated as the search history DB 31 for each specific person.

The search history DB 31, which is the search history accumulated by the search history accumulation processing unit 45, is stored in the storage 22C. FIG. 5 shows an example of the search history DB 31. As shown in FIG. 5, in the search history DB 31, the search history is associated with the name indicating each target subject and the icon indicating the target subject displayed on the search screen (details will be described below), for each target subject.

In the example shown in FIG. 5, two of "travel destination hot spring" and "match result baseball" are accumulated in the search history DB 31 as the search history for a target subject A. Three of "lunch Italian food", "present flower", and "lunch" are accumulated in the search history DB 31 as the search history for the target subject B. Three of "lunch Chinese food", "drive", and "lunch" are accumulated in the search history DB 31 as the search history for the target subject C. Two of "hospital" and "day care" are accumulated in the search history DB 31 as the search history for a target subject D. In addition, two of "trimming" and "dog run" are accumulated in the search history DB 31 as the search history for a target subject E.

The search result acquisition unit 46 acquires the search result obtained by the search using the search engine 13 based on the keyword 62 corresponding to the first search condition 60 of the search objective target subject and the search history of the search objective target subject. Specifically, the search result acquisition unit 46 specifies the keyword 62 included in the first search condition 60 for each search objective target received by the search condition reception unit 44 as the keyword to be used for the search (hereinafter, referred to as a first keyword). It should be noted that the first keyword is specified from the first search condition 60, but a case is included in which the first search condition 60 is the first keyword. In other words, a case is included in which the first keyword is input as the first search condition 60. The search result acquisition unit 46 acquires the search history of the search objective target subject received by the search objective target reception unit 42 from the search history DB 31 and specifies related-search history related to the first search condition 60 from the search history. It should be noted that, in a case in which the keyword is stored as the search history, a second keyword may be specified as the related-search history, and in a case in which the sentence and the like, which are not the keywords, are stored as the search history, the related-search history may be extracted based on the first search condition 60 to specify the second keyword from the extracted related-search history. In addition, the search result acquisition unit 46 decides a second search condition from the first search condition 60 and the related-search history. It should be noted that, in a case in which the first search condition 60 is the first keyword and the related-search history is the second keyword, a search keyword may be decided as the second search condition from the first keyword and the second keyword. In addition, in a case in which the first search condition and the related-search history are sentence and the like other than the keyword, a composite document or the like in which the first search condition and the related-search history are combined may be created to use the search keyword specified from the composite document as the second search condition. As an example, the search result acquisition unit 46 according to the present embodiment decides a combination of the first keyword and the second keyword as the search keyword. Further, the search result acquisition unit 46 transmits the decided search keyword as the search request to the search server 12. In the search server 12, the search is performed using the search engine 13 based on a plurality of keywords included in the search keyword, which is the search request received from the information processing apparatus 10, and the search result is transmitted to the information processing apparatus 10. As described above, the search result is, for example, the information, such as the title or the URL indicating the website including the keyword included in the received search request.

The search result acquisition unit 46 receives the search result transmitted by the search server 12, specifies the search result to be displayed on the display unit 28 based on the received search result, and outputs the search result to the display processing unit 48.

The display processing unit 48 has a function of displaying the search result on the display unit 28. It should be noted that a method by which the display processing unit 48 displays the search result on the display unit 28 is not particularly limited.

Figure 6:
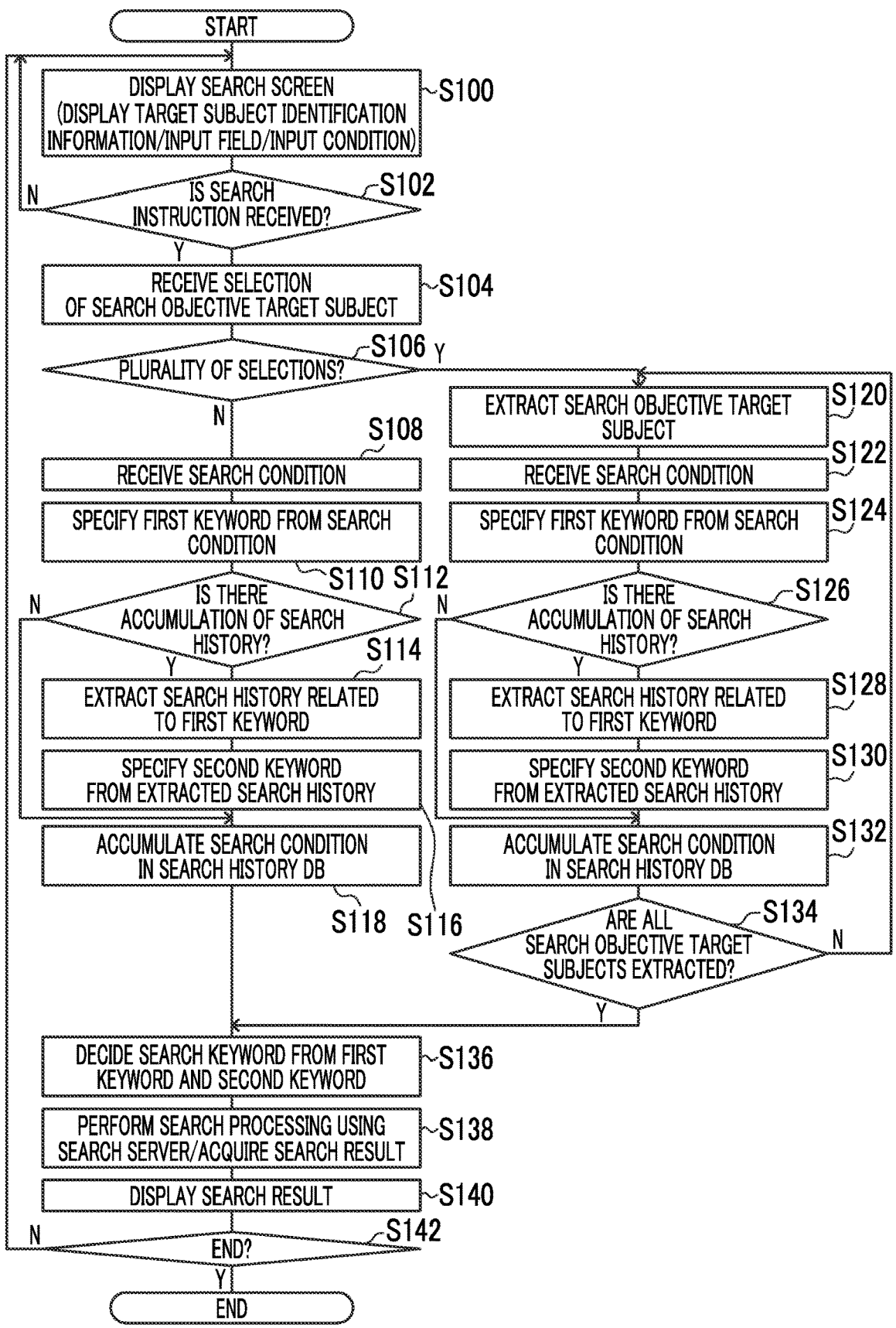
FIG. 6 is a flowchart showing an example of a flow of information processing by the information processing apparatus according to the embodiment.

Next, an action of the information processing apparatus 10 according to the present embodiment will be described with reference to the drawings. FIG. 6 shows a flowchart showing an example of a flow of information processing executed by the information processing apparatus 10 according to the present embodiment. The information processing apparatus 10 according to the present embodiment executes the information processing shown in FIG. 6 by the CPU 20A of the controller 20 executing the information processing program 23 stored in the storage 22C based on the instruction or the like of the searcher performed by the operation unit 26, as an example.

In step S100 of FIG. 6, the search screen 80 is displayed. The search objective target reception unit 42 displays the target subject identification information 50 on the search screen 80. In addition, the search condition reception unit 44 displays the input field 52 on the search screen 80.

As described above, the searcher operates the operation unit 26 to input the keyword 62 that is the first search condition 60 to the input field 52 corresponding to the target subject identification information 50 indicating the search objective target subject to be selected. After the input of the first search condition 60 designated for the selected search objective target subject ends, the searcher operates the search button 54 to instruct the execution of the search.

In next step S102, it is determined whether or not a search instruction is received. Until the search instruction is received, in other words, until the searcher operates the search button 54 to instruct the execution of the search, a negative determination is made in the determination in step S102, and the processing returns to step S100. On the other hand, in a case in which the search instruction is received, a positive determination is made in the determination in step S102, and the processing proceeds to step S104.

In step S104, the search objective target reception unit 42 receives the selection of the search objective target subject as described above. For example, in the example shown in FIG. 4, the "target subject B" and the "target subject C" are received as the search objective target subject.

In next step S106, the search result acquisition unit 46 determines whether or not a plurality of search objective target subjects are selected. In a case in which the number of selected search objective target subjects is not plural, in other words, in a case in which the selected search objective target subject is one, a negative determination is made in the determination in step S106, and the processing proceeds to step S108.

In step S108, as described above, the search condition reception unit 44 receives the first search condition 60 input to the input field 52 provided for each search objective target subject on the search screen 80. In next step S110, the search result acquisition unit 46 specifies the first keyword from the keyword 62 included in the received first search condition 60, as described above.

In next step S112, the search result acquisition unit 46 determines whether or not the search history associated with the search objective target subject is accumulated. Specifically, it is determined whether or not the search history associated with the search objective target subject received in step S104 is accumulated in the search history DB 31 stored in the storage 22C. In a case in which the search history is not accumulated, a negative determination is made in the determination in step S112, and the processing proceeds to step S118. On the other hand, in a case in which the search history is accumulated, a positive determination is made in the determination in step S112, and the processing proceeds to step S114.

In step S114, the search result acquisition unit 46 extracts the related-search history related to the first keyword specified in step S110 from the search history corresponding to the selected search objective target subject. By repeating the search, a plurality of search histories are accumulated in association with the search objective target subject. There is a case in which the accumulated search histories include a search history having a low relation to the current search. Therefore, the search result acquisition unit 46 extracts the related-search history related to the first keyword from among the accumulated search histories as the related-search history related to the current search.

The related-search history may be extracted by performing a similarity analysis between the first search condition 60 and the search history. For example, the sentence or keyword used as the related-search history is extracted by performing the similarity analysis between the sentence or keyword included in the first search condition 60 and the sentence or keyword included in the search history. In the similarity analysis, for example, a rate of match between the first keyword included in the first search condition 60 and the keyword included in the search history is analyzed, and the search history including the keyword having a high rate of match is extracted as the related-search history. It should be noted that the search history having a high rate of match may be the search history having the largest number of matching keywords. In addition, the search history having a high rate of match may be the search history in which the number of matching keywords or a ratio of matching keywords to all the first keywords is equal to or greater than a predetermined reference value. It should be noted that the reference value may be a set value set in advance, or an input value input by the user.

In addition, the sentence or keyword included in the first search condition 60 and the sentence or keyword included in the search history are subjected to the similarity analysis, but the present disclosure is not limited to this. A sentence or a word describing the meaning or concept of a word in the sentence or keyword included in the first search condition 60 or the search history may be acquired from a dictionary site, such as Wikipedia, to perform the similarity analysis by using the acquired sentence or the like describing the meaning or concept. For example, the similarity analysis may be performed between the sentence or the like describing the meaning or concept of the first keyword and the sentence or the like describing the meaning or concept of the keyword in the search history to use the search history including the keyword corresponding to the sentence or the like describing similar meaning or concept as the related-search history.

In addition, the similarity analysis is not limited to the rate of match between words, and systematized information in which keywords are systematized (ontology) may be stored and the systematized information may be used. The systematized information defines the concept, a usage, and a convention for describing the keyword. For example, "lunch" is a subordinate operation of "meal", and "Italian food" is a subordinate operation of lunch, that is, the systematization can be made into a relationship of "meal"-"lunch"-"Italian food". In a case in which "lunch Chinese food" is input as the first keyword, the same word may be found in a systematized dictionary (lunch in this case) to determine from the hierarchical relationship whether or not the search has the same objective and to extract the keyword having a high rate of match. Further, the similarity analysis may be performed by vectorization of the sentence, the keyword, or the like by natural language processing such as latent semantic indexing (LSI) and comparing the vectors.

In next step S116, the search result acquisition unit 46 specifies the second keyword from the related-search history extracted in step S114. There is a case in which the related-search history includes a plurality of keywords 62. In the example shown in FIG. 4, in a case of performing the search, "lunch Italian food" is accumulated in the search history DB 31 in association with the target subject B as the search history of the target subject B which is the search objective target subject. As described above, "lunch Italian food" which is the search history includes the two keywords 62 of "lunch" and "Italian food". In such a case, the search result acquisition unit 46 specifies at least one keyword 62 of "lunch" or "Italian food" as the second keyword.

In next step S118, the search history accumulation processing unit 45 accumulates the first search condition 60 received in step S108 in the search history DB 31 in association with the search objective target subject received in step S104, and the processing proceeds to step S136.

On the other hand, in a case in which the number of the selected search objective target subjects is plural as in the example shown in FIG. 4, a positive determination is made in the determination in step S106, and the processing proceeds to step S120. In step S120, the search result acquisition unit 46 extracts one search objective target subject from among the plurality of selected search objective target subjects.

In next steps S122 to S132 correspond to steps S108 to S118 described above, respectively. That is, for the search objective target subject extracted in step S120, in a case in which the first search condition 60 is received, the first keyword is specified, and the search history is accumulated, the related-search history related to the first keyword is extracted to specify the second keyword and the first search condition 60 is accumulated in the search history DB 31.

In next step S134, the search result acquisition unit 46 determines whether or not all of the plurality of selected search objective target subjects are extracted in step S120. In a case in which there is a search objective target subject that has not been extracted yet, a negative determination is made in the determination in step S134, the processing returns to step S120, the search objective target subject that has not yet been extracted is extracted, and the processing of steps S122 to S132 is repeated. On the other hand, in a case in which all the search objective target subjects are extracted, a positive determination is made in the determination in step S134, and the processing proceeds to step S136.

It should be noted that, in addition to the first search condition 60, the relationships input by the plurality of search objective target subjects may also be accumulated. In other words, the information on the search objective target subjects searched at the same time may be stored in association with the first search condition 60. That is, in a case in which the keywords are input to the target subject B and the target subject C to perform the search as shown in FIG. 4, as the search history of the target subject B, the first search condition 60 of the target subject B and relationship information indicating that the search objective target subjects which are searched at the same time are the target subject B and the target subject C may be recorded in association with each other. In addition, the relationship information may be used in a case of extracting the related-search history based on the first search condition 60. Specifically, the rate of match between the search objective target subject selected in step S106 and the relationship information associated with the search history may be analyzed to perform the similarity analysis of the sentence or keyword with the search history having a high rate of match as a target.

In step S136, the search result acquisition unit 46 decides the search keyword from the first keyword and the second keyword. As described above, the search result acquisition unit 46 according to the present embodiment decides the search keyword by combining the first keyword and the second keyword.

In next step S138, as described above, the search result acquisition unit 46 performs the search processing using the search engine 13 of the search server 12 and acquires the search result from the search server 12. Specifically, the search result acquisition unit 46 transmits the search request including the search keyword decided in step S136 to the search server 12 via the network 19, and receives the search result by the search engine 13 from the search server 12 via the network 19.

In next step S140, the display processing unit 48 displays the search result on the display unit 28. Specifically, the search result acquired in step S138 is displayed on the display unit 28.

In next step S142, it is determined whether or not the information processing shown in FIG. 6 ends. As an example, in the present embodiment, until a predetermined end condition is satisfied, a negative determination is made in the determination in step S142, the processing returns to step S100, and the processing of steps S100 to S140 is repeated.

On the other hand, in a case in which the predetermined end condition, such as reception of an instruction to end the search by the searcher, is satisfied, a positive determination is made in the determination in step S142, and the information processing shown in FIG. 6 ends.

A specific example of the action of the information processing apparatus 10 will be described with reference to FIGS. 7A to 7E. In the following description, a case will be described in which the target subject A is the searcher. However, in the information processing apparatus 10, the same processing is performed even in a case in which the searcher is a person other than the target subject A.

Figure 7A:
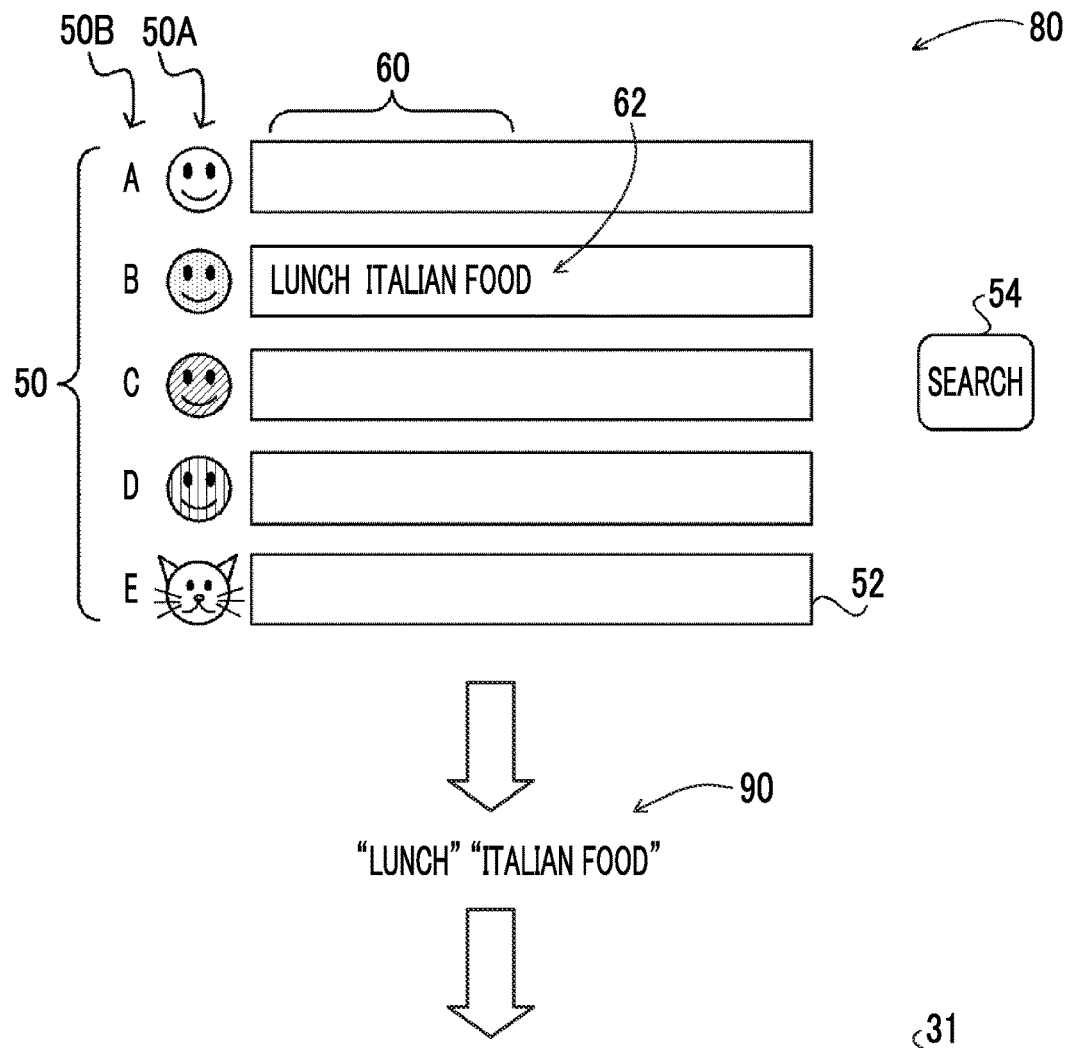
FIG. 7A is a diagram for describing a specific example of an action of the information processing apparatus according to the embodiment.

First, with reference to FIG. 7A, a case will be described in which the target subject A, which will go to lunch with the target subject B which likes Italian food, and searches for the lunch destination. The searcher inputs "lunch Italian food" as the first search condition 60 to the input field 52 provided corresponding to the icon 50A and the name 50B indicating the target subject B by operating the operation unit 26 and presses the search button 54. In this case, the search objective target reception unit 42 receives that the target subject B is selected as the search objective target subject (S104). In addition, the search condition reception unit 44 receives the first search condition 60 of "lunch Italian food" (S108). The search result acquisition unit 46 specifies the two keywords 62 of "lunch" and "Italian food" as the first keyword (S110). In a case in which there is no search history associated with the target subject B, the search result acquisition unit 46 performs the search processing using the search engine 13 of the search server 12 with search keywords 90 of "lunch" and "Italian food", and acquires the search result from the search server 12 (S138). The search history accumulation processing unit 45 accumulates the search history of "lunch Italian food" in association with the target subject B (S118).

In addition, with reference to FIG. 7B, a case will be described in which the target subject A, which will go to lunch with the target subject C which likes Chinese food, and searches for the lunch destination. The searcher inputs "lunch Chinese food" as the first search condition 60 to the input field 52 provided corresponding to the icon 50A and the name 50B indicating the target subject C by operating the operation unit 26 and presses the search button 54. In this case, the search objective target reception unit 42 receives that the target subject C is selected as the search objective target subject (S104). In addition, the search condition reception unit 44 receives the first search condition 60 of "lunch Chinese food" (S108). The search result acquisition unit 46 specifies the two keywords 62 of "lunch" and "Chinese food" as the first keyword (S110). In a case in which there is no search history associated with the target subject C, the search result acquisition unit 46 performs the search processing using the search engine 13 of the search server 12 with search keywords 90 of "lunch" and "Chinese food", and acquires the search result from the search server 12 (S138). The search history accumulation processing unit 45 accumulates the search history of "lunch Chinese food" in association with the target subject C (S118).

Figure 7C:
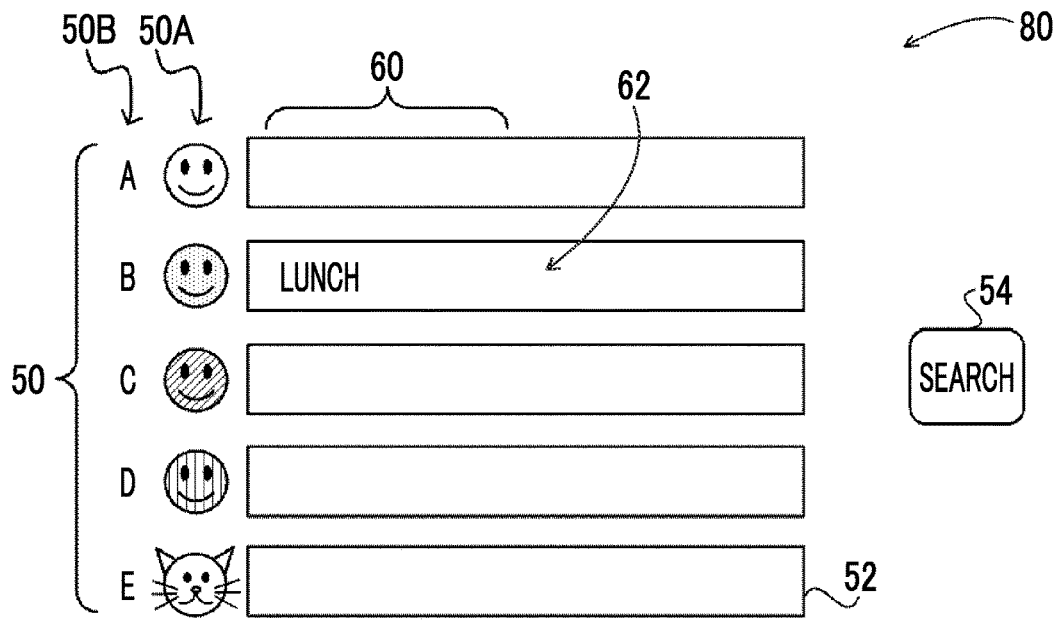
FIG. 7C is a diagram for describing a specific example of the action of the information processing apparatus according to the embodiment.
Figure 7C:

Thereafter, with reference to FIG. 7C, a case will be described in which the target subject A, which will go to lunch again with the target subject B, searches for the lunch destination. The searcher inputs "lunch" as the first search condition 60 to the input field 52 provided corresponding to the icon 50A and the name 50B indicating the target subject B by operating the operation unit 26 and presses the search button 54. In this case, the search objective target reception unit 42 receives that the target subject B is selected as the search objective target subject (S104). In addition, the search condition reception unit 44 receives the first search condition 60 of "lunch" (S108). The search result acquisition unit 46 specifies the keyword 62 of "lunch" as the first keyword (S110). Since there is the search history associated with the target subject B, the search result acquisition unit 46 specifies "Italian food" as the second keyword as the keyword related to "lunch" from the search history of "lunch Italian food" associated with the target subject B of the search history DB 31 (S116). The search result acquisition unit 46 performs the search processing using the search engine 13 of the search server 12 with the search keywords 90 of "lunch" and "Italian food", and acquires the search result from the search server 12 (S138). The search history accumulation processing unit 45 accumulates the search history of "lunch" in association with the target subject B (S118). In this way, since the search history associated with the target subject B is accumulated, it is possible to display the search result reflecting the preference of the target subject B even with only the keyword 62 of "lunch". In addition, since the search keyword 90 does not include the second keyword specified from the search history associated with the target subject C, it is possible to display the search result that more matches the preference of the target subject B. For example, even in a case in which the target subject B does not like Chinese food, since the search history associated with the target subject C is not referred to, and "Chinese food" is not included in the search keyword 90, it is possible to display the search result that more matches the preference of the target subject B.

Figure 7D:
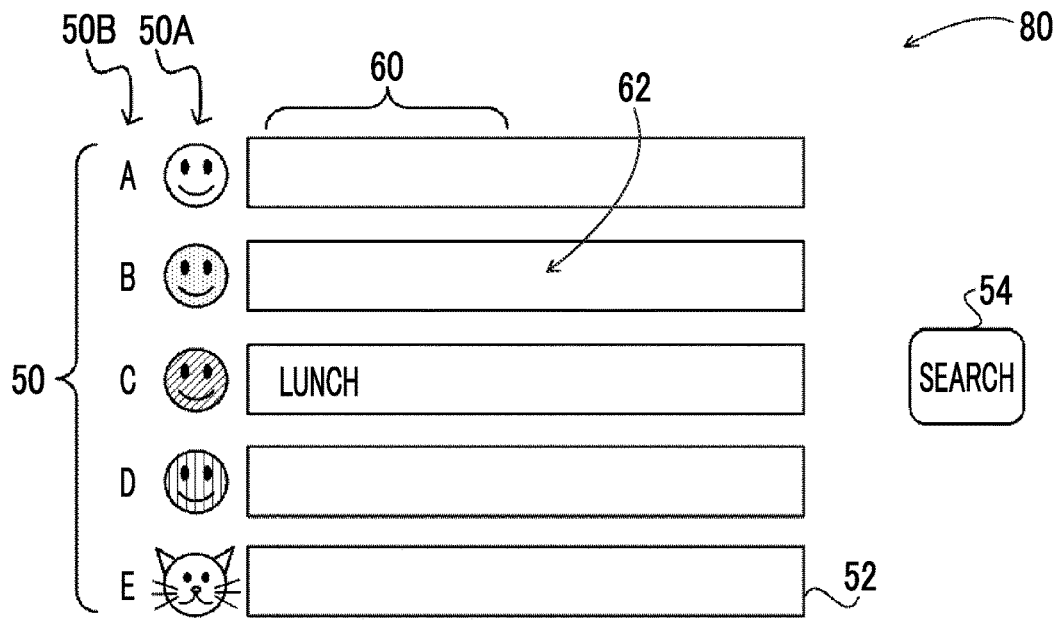
FIG. 7D is a diagram for describing a specific example of the action of the information processing apparatus according to the embodiment.

Similarly, with reference to FIG. 7D, a case will be described in which the target subject A, which will go to lunch again with the target subject C, searches for the lunch destination. The searcher inputs "lunch" as the first search condition 60 to the input field 52 provided corresponding to the icon 50A and the name 50B indicating the target subject C by operating the operation unit 26 and presses the search button 54. In this case, the search objective target reception unit 42 receives that the target subject C is selected as the search objective target subject (S104). In addition, the search condition reception unit 44 receives the first search condition 60 of "lunch" (S108). The search result acquisition unit 46 specifies the keyword 62 of "lunch" as the first keyword (S110). Since there is the search history associated with the target subject C, the search result acquisition unit 46 specifies "Chinese food" as the second keyword as the keyword related to "lunch" from the search history of "lunch Chinese food" associated with the target subject C of the search history DB 31 (S116). The search result acquisition unit 46 performs the search processing using the search engine 13 of the search server 12 with the search keywords 90 of "lunch" and "Chinese food", and acquires the search result from the search server 12 (S138). The search history accumulation processing unit 45 accumulates the search history of "lunch" in association with the target subject C (S118). In this way, since the search history associated with the target subject C is accumulated, it is possible to display the search result reflecting the preference of the target subject C even with only the keyword 62 of "lunch". In addition, since the search keyword 90 does not include the second keyword specified from the search history associated with the target subject B, it is possible to display the search result that more matches the preference of the target subject C. For example, even in a case in which the target subject C does not like Italian food, since the search history associated with the target subject B is not referred to, and "Italian food" is not included in the search keyword 90, it is possible to display the search result that more matches the preference of the target subject C.

Figure 7E:
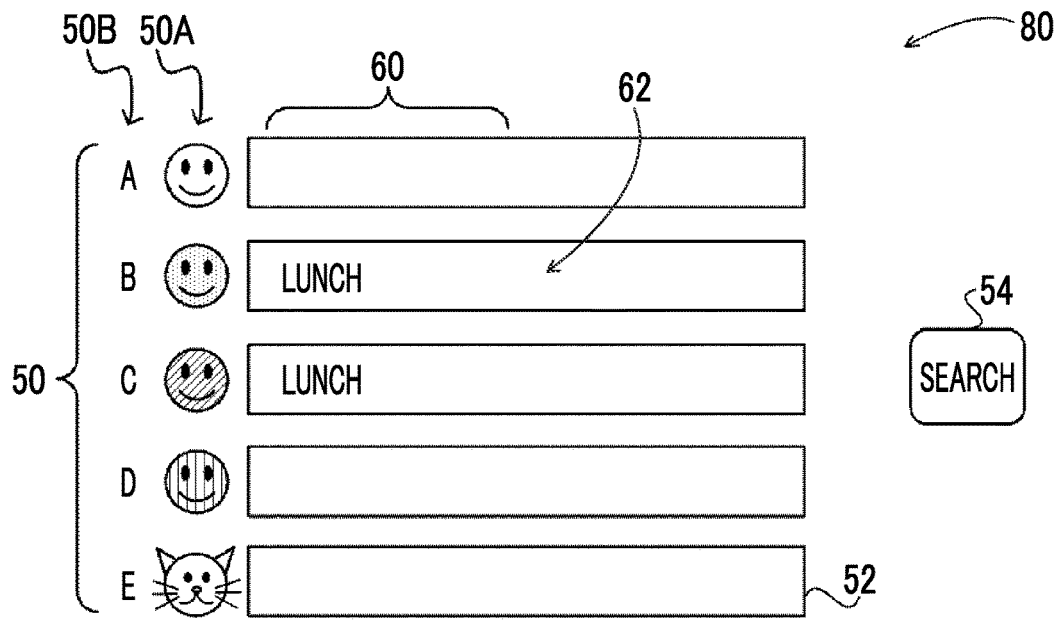
FIG. 7E is a diagram for describing a specific example of the action of the information processing apparatus according to the embodiment.

Further, with reference to FIG. 7E, a case will be described in which the target subject A, which will go to lunch again with the target subject B and the target subject C, searches for the lunch destination. The searcher inputs "lunch" as the first search condition 60 to the input field 52 provided corresponding to the icon 50A and the name 50B indicating the target subject B and "lunch" as the first search condition 60 to the input field 52 provided corresponding to the icon 50A and the name 50B indicating the target subject C by operating the operation unit 26, and presses the search button 54. In this case, the search objective target reception unit 42 receives that the target subject B and the target subject C are selected as the search objective target subject (S104). In addition, the search condition reception unit 44 receives the first search condition 60 of "lunch" (S122). The search result acquisition unit 46 specifies each of the keyword 62 of "lunch" for the target subject B and the keyword 62 of "lunch" for the target subject C as the first keyword (S124). Since there is the search history associated with the target subject B, the search result acquisition unit 46 specifies "Italian food" as the second keyword as the keyword related to "lunch" of the target subject B from the search history of "lunch Italian food" associated with the target subject B of the search history DB 31 (S130). In addition, since there is the search history associated with the target subject C, the search result acquisition unit 46 specifies "Chinese food" as the second keyword as the keyword related to "lunch" of the target subject C from the search history of "lunch Chinese food" associated with the target subject C of the search history DB 31 (S130). The search result acquisition unit 46 performs the search processing using the search engine 13 of the search server 12 with the search keywords 90 of "lunch", "Italian food", and "Chinese food", and acquires the search result from the search server 12 (S138). The search history accumulation processing unit 45 accumulates the search history of "lunch" in association with the target subject B and accumulates the search history of "lunch" in association with the target subject C (S132). In this way, since the search history associated with the target subject B and the search history associated with the target subject C are accumulated, even in a case in which there is only the keyword 62 of "lunch", it is possible to display the search result reflecting the preferences of both the target subject B and the target subject C.

It should be noted that, in the present embodiment, the form has been described in which, in a case in which the number of the search objective target subjects is plural, the search keyword including all the second keywords specified from the search history of each search objective target subject is decided, but the search keyword is not limited to the present form. For example, the first keyword and the second keyword may be specified for each search objective target subject to decide the search keyword for each search objective target subject. In this case, the search processing is performed using the search engine 13 of the search server 12 with the search keyword as the search request for each search objective target subject to acquire the search result from the search server 12. That is, the search result acquisition unit 46 acquires a plurality of search results obtained by performing the search for each search objective target subject. In addition, the search result acquisition unit 46 extracts a product wp of a set of the search results for each search objective target subject as a final search result, and the display processing unit 48 displays the search result on the display unit 28.

The present embodiment described above is an example of the technology of the present disclosure, and various modification examples can be made. For example, the following modification examples and the like may be made.

Modification Example 1

In the embodiment described above, the form has been described in which the search is performed using the search keyword obtained by combining the second keyword extracted from the accumulated search history and the first keyword as the search request, but the search keyword is not limited to this. For example, a form may be adopted in which the search result performed using the search keyword including only the first keyword as the search request is displayed on the display unit 28 in a priority order corresponding to the second keyword. Specifically, the search result having a higher degree of association to the second keyword is displayed on the display unit 28 with a higher priority order.

Figure 8:
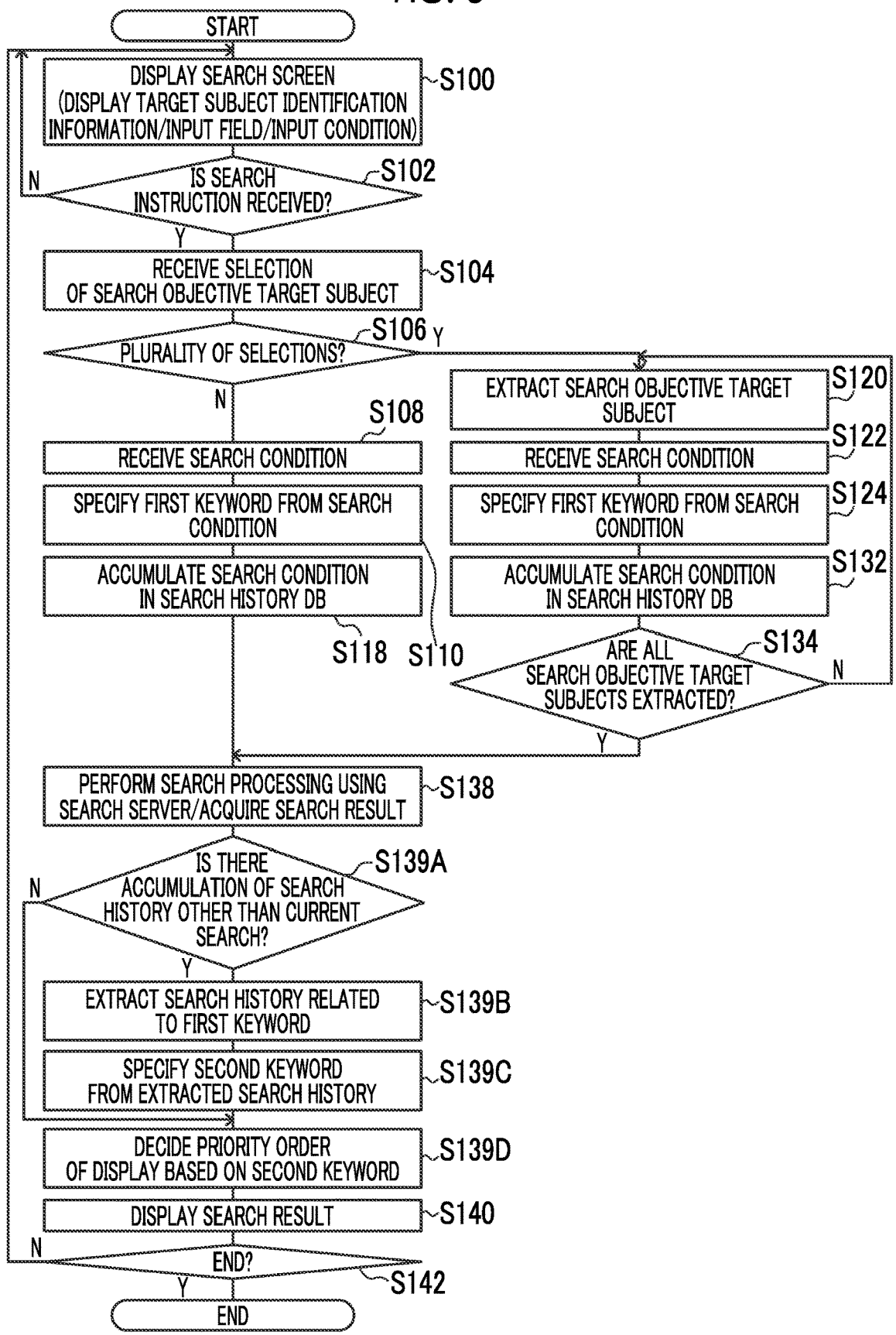
FIG. 8 is a flowchart showing an example of a flow of information processing by an information processing apparatus according to a modification example 1.

FIG. 8 shows a flowchart showing an example of a flow of information processing by the information processing apparatus 10 according to the present modification example. As shown in FIG. 8, the information processing according to the present modification example is different from the information processing (see FIG. 6) according to the embodiment described above in that the processing of steps S112 to S116, S126 to S130, and S136 are not included and processing of steps S139A to S139D are included between step S138 and step S140.

That is, in the present modification example, the search processing using the search engine 13 of the search server 12 is performed in step S138 by using the first keyword specified from the first search condition 60 in step S110 or step S124 as the search keyword to acquire the search result from the search server 12.

In next step S139A, the search result acquisition unit 46 determines whether or not the search history associated with the search objective target subject is accumulated, in addition to the search history accumulated by the current search.

Specifically, it is determined whether or not the search history other than the search history accumulated in step S118 or S132 is accumulated in the search history DB 31 stored in the storage 22C in association with the search objective target subject. In a case in which the search history is not accumulated, a negative determination is made in the determination in step S139A, and the processing proceeds to step S139D. On the other hand, in a case in which the search history is accumulated, a positive determination is made in the determination in step S139A, and the processing proceeds to step S139B.

In step S139B, the search result acquisition unit 46 extracts the related-search history related to the first keyword specified in step S110 or S124 from the search history corresponding to the selected search objective target subject.

In next step S139C, the search result acquisition unit 46 specifies the second keyword from the related-search history extracted in step S139B, and outputs the specified second keyword to the display processing unit 48.

In next step S139D, the display processing unit 48 decides the priority order of the display of the search result acquired in step S138 based on the second keyword specified in step S139C, and then the processing proceeds to step S140. Specifically, the display processing unit 48 decides a higher priority order as the relation to the second keyword specified in step S139C is higher.

As a result, in step S140, the display processing unit 48 can display the search result in the priority order corresponding to the second keyword specified from the related-search history.

Modification Example 2

Figure 9:
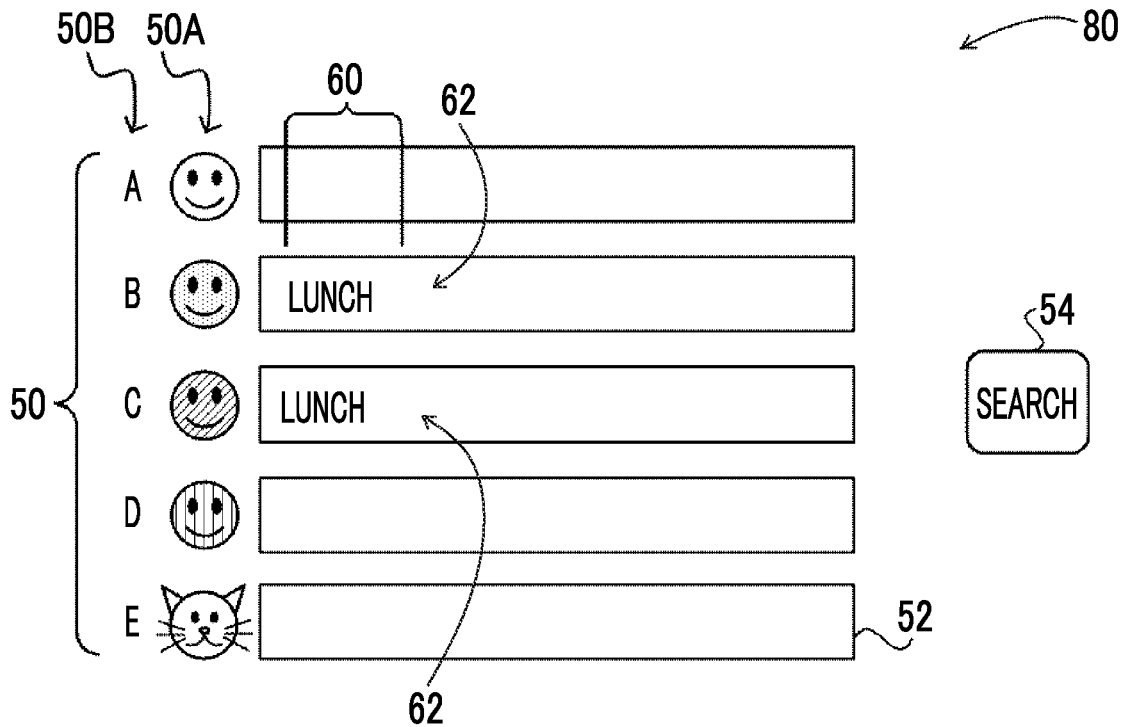
FIG. 9 is a diagram showing an example of a search screen displayed on a display unit of an information processing apparatus according to a modification example 2.
Figure 9:
Figure 9:

In the present modification example, in a case in which the search objective target reception unit 42 receives the selection of the search objective target subject, the display processing unit 48 displays the search history accumulated in the search history DB 31 in association with the selected search objective target subject on the display unit 28. FIG. 9 shows an example of a form in which the display processing unit 48 displays the search history associated with the selected search objective target subject on the display unit 28. The example shown in FIG. 9 shows a state in which three of "lunch Italian food", "lunch", and "travel destination hot spring" are displayed as the search history 92 of the target subject B which is the search objective target subject and three of "lunch Chinese food", "lunch", and "travel destination theme park" are displayed as the search history 92 of the target subject C which is the search objective target subject.

As described above, in the present modification example, since the display processing unit 48 displays the search history 92 associated with the search objective target subject on the display unit 28, the searcher can designate the first search condition 60 used for the current search with reference to the displayed search history 92. Therefore, the searcher can input an appropriate keyword 62 corresponding to the search objective target subject in the input field 52. It should be noted that, in the present modification example, the search history of the search objective target subject is displayed regardless of the relation between the search history and the first search condition 60, but the present disclosure is not limited to this. For example, in a case in which the first search condition 60 is received, only the related-search history related to the first search condition 60 may be extracted and displayed.

Modification Example 3

Further, the search may be performed by using attribute information related to the search objective target subject.

The information processing apparatus 10 has a function of setting the attribute information indicating an attribute of the target subject which is the search objective. For example, in a case in which the search for a leisure destination is performed, a desired search result differs depending on whether the search objective target subject is an indoor person or an outdoor person. In such a case, in the information processing apparatus 10 according to the present modification example, in such a case, in a case in which the search objective target subject is the indoor person, the leisure destination for the indoor person is obtained as the search result by setting the attribute of the indoor person. On the other hand, in a case in which the search objective target subject is the outdoor person, the leisure destination for the outdoor person is obtained as the search result by setting the attribute of the outdoor person.

Figure 10:
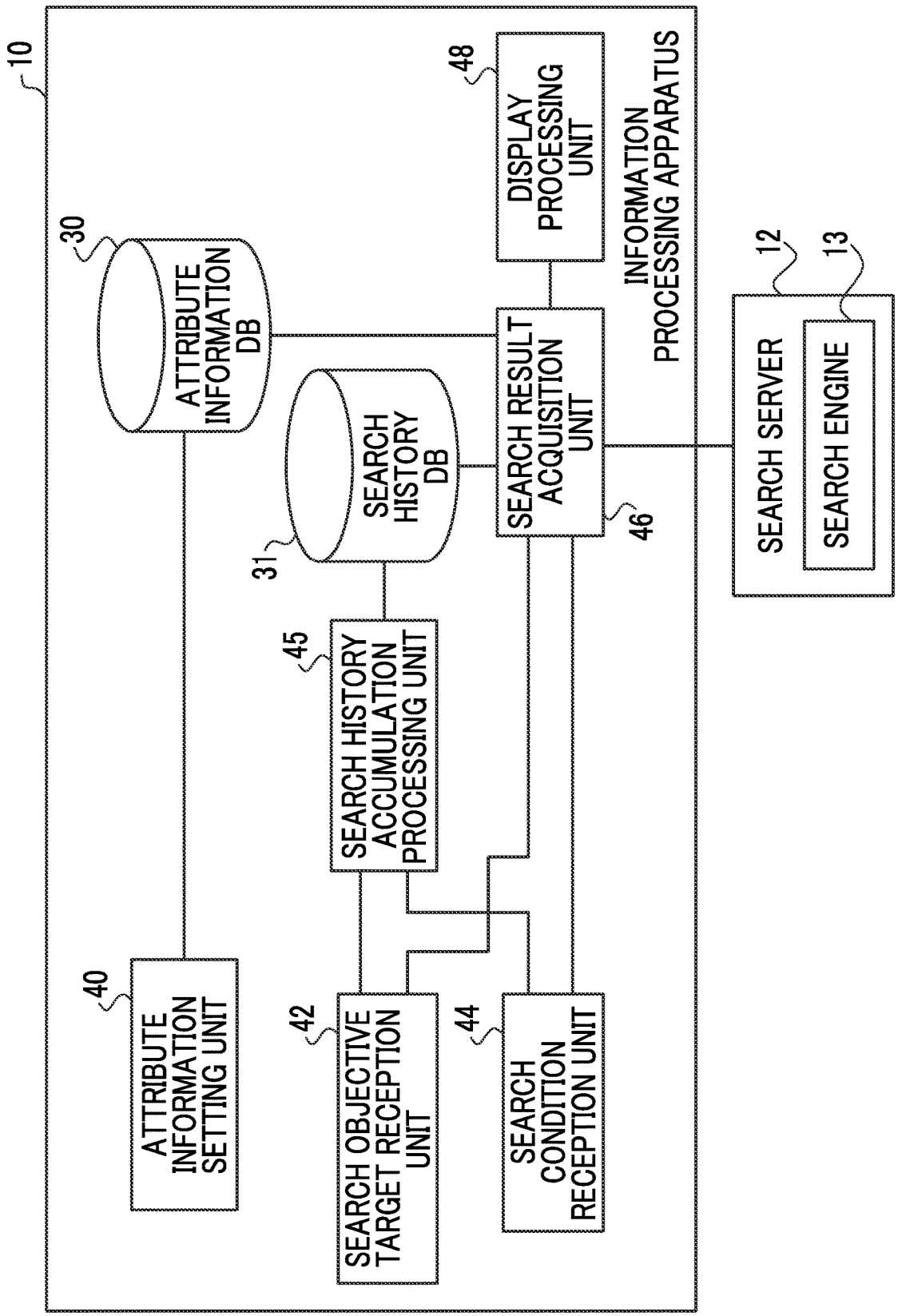
FIG. 10 is a functional block diagram showing an example of a function of an information processing apparatus according to a modification example 3.

As shown in FIG. 10, the information processing apparatus 10 according to the present modification example further comprises an attribute information setting unit 40.

Figure 11:
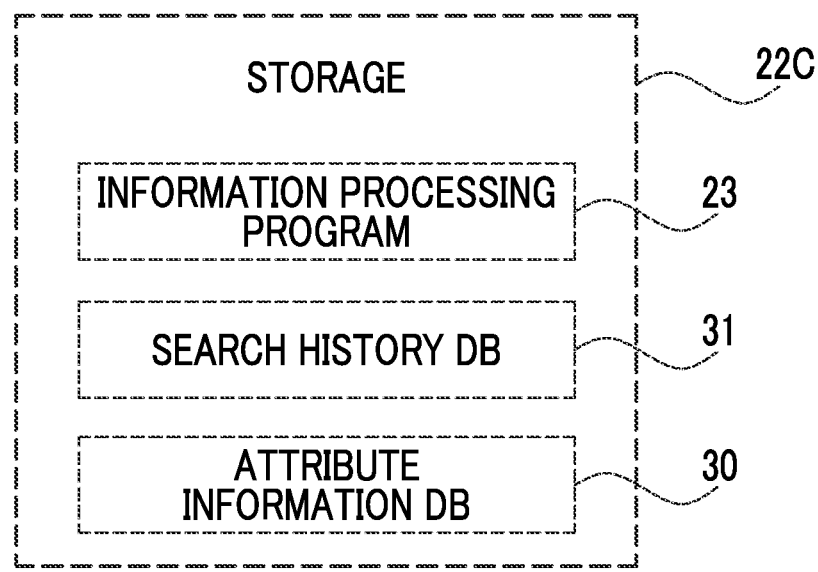
FIG. 11 is a block diagram showing an example of a storage of the modification example 3.

The attribute information setting unit 40 has a function of setting the attribute information indicating the attribute of the target subject which is the search objective. As shown in FIG. 11, the attribute information set by the attribute information setting unit 40 is stored in the storage 22C as an attribute information DB 30.

FIG. 12A shows an example of the attribute information DB 30 (30A). As shown in FIG. 12A, in the attribute information DB 30, the attribute information is associated with the name indicating each target subject and the icon indicating the target subject displayed on the search screen (details will be described below), for each target subject. As an example, in the attribute information included in the attribute information DB 30A shown in FIG. 12A, the information indicating the attribute of the target subject is set for each of a plurality of items.

In the example shown in FIG. 12A, in a case in which the target subject is a human, as items of the attribute, seven of "age", "gender", "occupation", "hobby", "physical information", "relationship information", and "others" are adopted. Among the items, "age" is an age of the target subject, "gender" is a gender of the target subject, and "occupation" is an occupation of the target subject. In addition, among the items, "hobby" is a hobby of the target subject, and "physical information" is information on a body of the target subject, for example, information on health. In addition, among the items, the "relationship information" is information indicating a relationship, such as a connection among a plurality of target subjects set in the attribute information DB 30. FIG. 12B shows an example of relationship information 30B. The relationship information 30B is information indicating the connection of another target subject as seen from the target subject himself/herself. In the example shown in FIG. 12B, in a case in which the target subject A is the person himself/herself, the target subject B is a "wife", the target subject C is a "son", the target subject D is a "mother", and the target subject E is a "pet". In addition, among the items, "others" is information on the attribute of the target subject, which is not classified into each of the items described above. Examples of the attribute information that is regarded as "others" include a living environment (living environment), such as a single-family house or an apartment complex, living alone or having a co-resident, but the present disclosure is not particularly limited.

On the other hand, in the example shown in FIG. 12A, in a case in which the target subject is an animal, such as a pet, as the items of the attribute, seven of "age", "gender", "category 1", "category 2", "physical information", and "relationship information", and "others" are adopted. Among these items, "age", "gender", "category 1", "category 2", "physical information", "relationship information", and "others" are the same as in the case in which the target subject is the human. On the other hand, among the items, "category 1" is information indicating a type of an animal, such as a dog, a cat, or a rabbit, and "category 2" is information indicating a specific breed.

It should be noted that the item of the attribute information shown in FIG. 12A is an example, the number and types of the items are not particularly limited, and it is not necessary to set the item in the attribute information.

Figure 13:
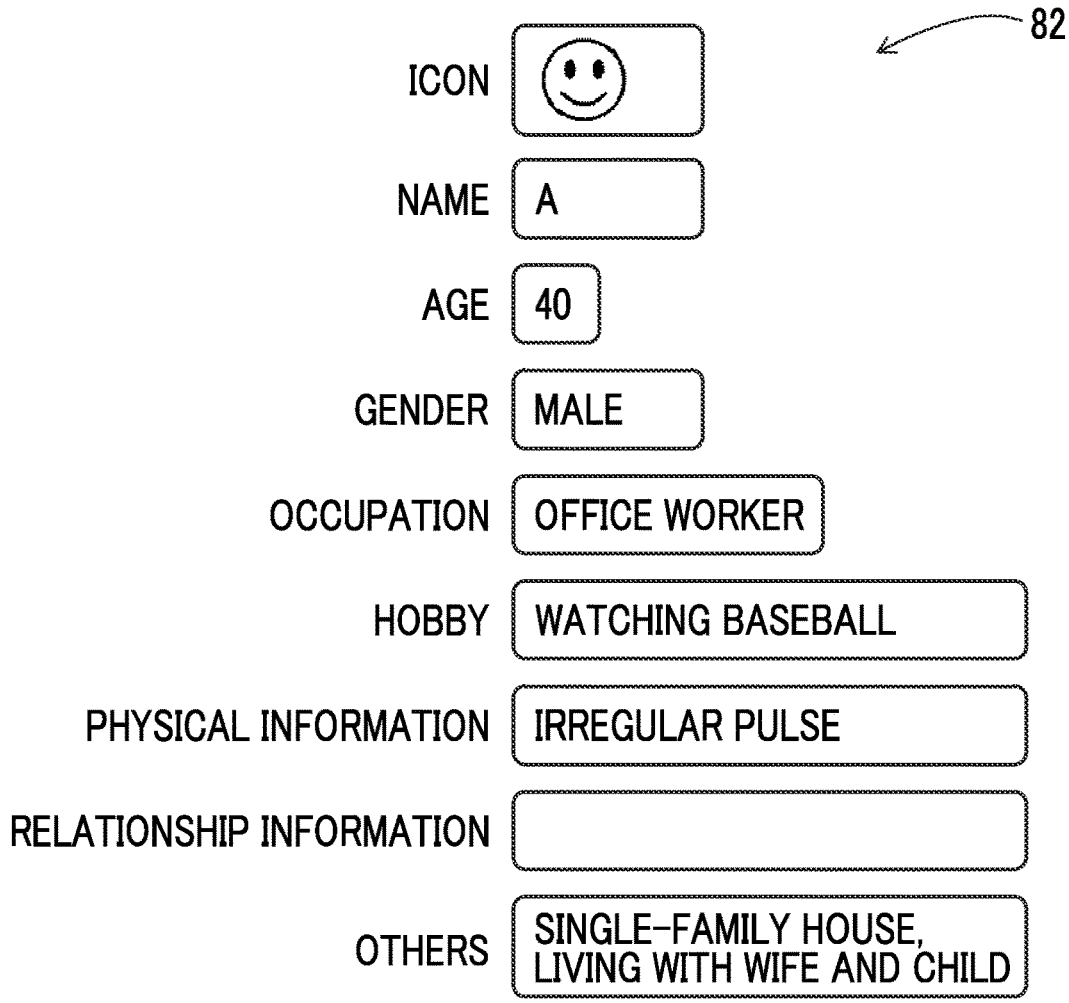
FIG. 13 is a diagram for describing an example of a setting screen for setting the attribute information.

The attribute information setting unit 40 has a function of setting such attribute information in the attribute information DB 30 for each target subject. It should be noted that a method by which the attribute information setting unit 40 sets the attribute information for each target subject by is not particularly limited. As an example, the attribute information setting unit 40 according to the present embodiment displays the setting screen 82 shown in FIG. 13 as an example on the display unit 28, and sets the attribute information input by the user performing the setting in accordance with the setting screen 82 using the operation unit 26 in the attribute information DB 30. It should be noted that a method of inputting the attribute information on the setting screen 82 is not particularly limited. For example, a form may be adopted in which the user who performs the setting may freely input the attribute information, or a form may be adopted in which, in a case in which each item is clicked, the types of the attributes that can be set are displayed as a pull-down menu, and the type of the attribute corresponding to the target subject is selected from among the types of the attributes.

The search result acquisition unit 46 according to the present modification example acquires the search result obtained by the search using the search engine 13 based on the first keyword corresponding to the first search condition 60 of the search objective target subject, the attribute information set for the search objective target subject, and the search history of the search objective target subject. Specifically, the search result acquisition unit 46 specifies the keyword to be used for the search from the attribute information indicating the attribute of the search objective target subject. Then, the search result acquisition unit 46 specifies the search keyword including the first keyword specified from the first search condition 60, the second keyword specified from the related-search history, and the keyword specified from the attribute information, transmits the specified search keyword to the search server 12 as the search request, and receives the search result from the search server 12.

As a result, the information processing apparatus 10 according to the present modification example can output the search result reflecting the attribute of the search objective target subject, so that the search accuracy can be further improved.

As described above, in the information processing apparatus 10 according to each form described above, the search objective target reception unit 42 receives the search objective target selected as the search objective from among the plurality of objective targets which are the objective target subjects or objective target objects capable of being the search objective. The search condition reception unit 44 receives the first search condition 60 designated for the search objective target. The search result acquisition unit 46 acquires the search result obtained by performing the search using the search engine 13 of the search server 12 based on the first search condition 60, and outputs the search result to the display processing unit 48. The search history accumulation processing unit 45 accumulates the first search condition 60 used for the search performed as the search objective target in the search history DB 31 as the search history for each of the plurality of objective targets.

As described above, in the information processing apparatus 10 according to each form described above, the search history is accumulated in association with each of a plurality of objective target subjects. Therefore, with the information processing apparatus 10 according to each form described above, the search accuracy can be improved as compared with a case in which the search history is not accumulated for each search objective target.

Figure 14:
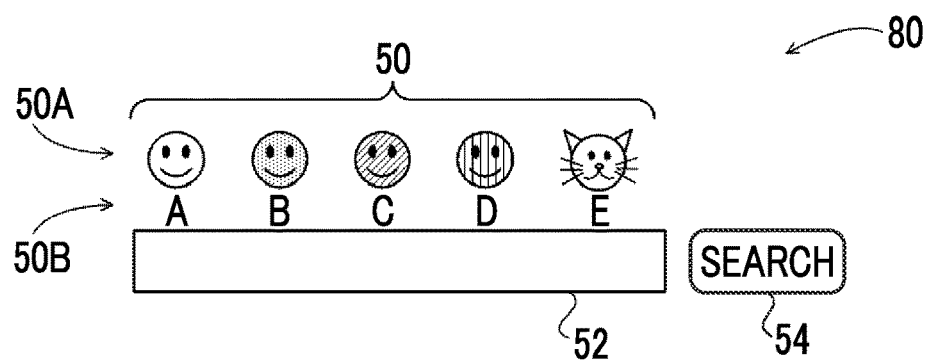
FIG. 14 is a diagram showing an example of the search screen displayed on the display unit of the information processing apparatus according to the embodiment.

It should be noted that, in each form described above, as shown in FIG. 4 or the like, the form has been described in which the input field 52 provided for each target subject is displayed as the search screen 80, but the search screen 80 is not limited to the present form. For example, as shown in FIG. 14, a form may be adopted in which one input field 52 is displayed for the plurality of target subjects. FIG. 14 shows an example of the search screen 80 displayed on the display unit 28. As shown in FIG. 14, the search screen 80 includes the target subject identification information 50 for identifying the target subject which can be the search objective, the input field 52, and the search button 54. The target subject identification information 50 includes an icon 50A indicating the target subject and a name 50B indicating a name of the target subject.

Figure 15A:
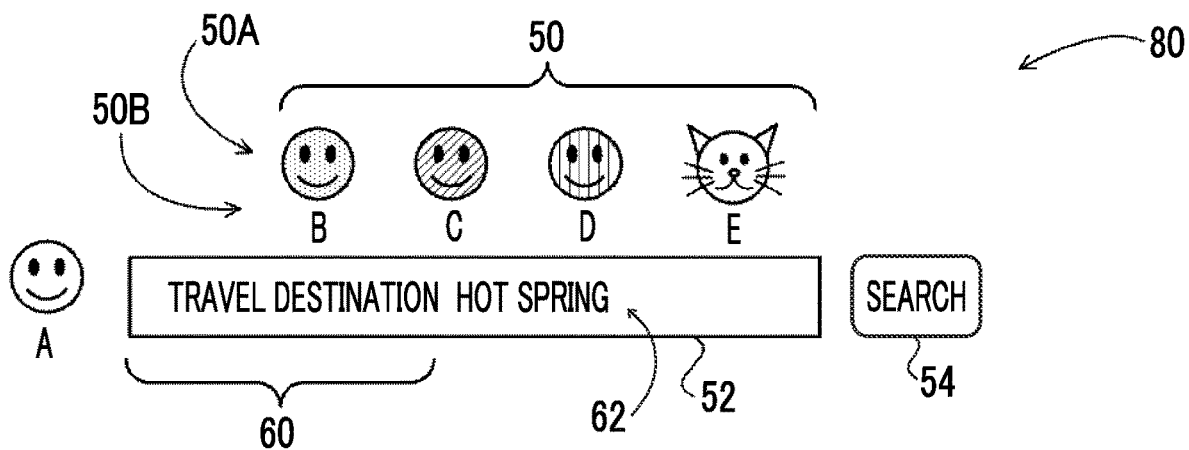
FIG. 15A is a diagram for describing an example of a search screen in a case in which a searcher selects one search objective target subject in the embodiment.
Figure 15B:
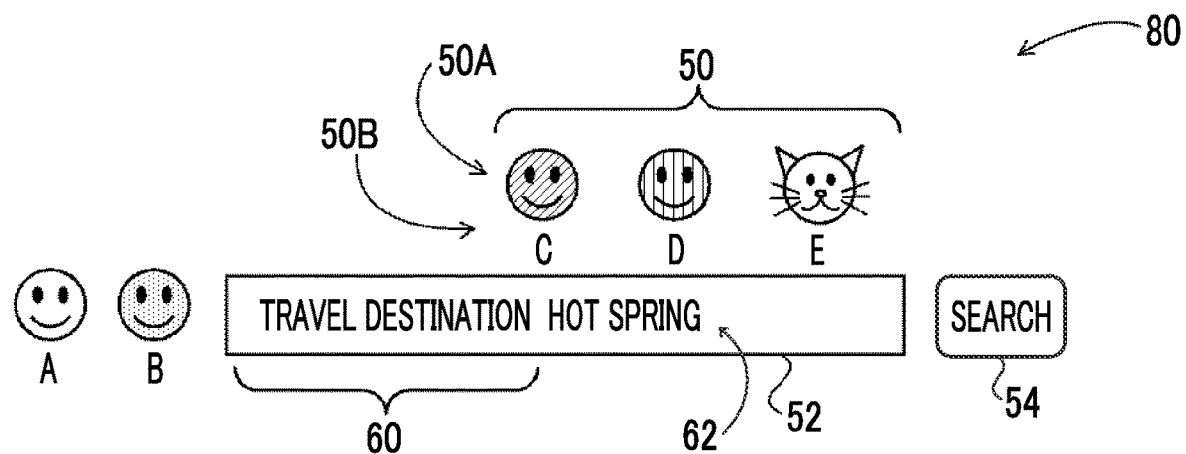
FIG. 15B is a diagram for describing an example of a search screen in a case in which the searcher selects a plurality of search objective target subjects in the embodiment.

The searcher selects the search objective target subject by, on the search screen 80, dragging and dropping the icon 50A corresponding to the search objective target subject in the current search from the target subject identification information 50 to the side of the input field 52 or clicking the icon 50A by the operation unit 26. FIG. 15A shows an example of the search screen 80 in a case in which the searcher selects one search objective target subject. Specifically, FIG. 15A shows a state in which the "target subject A" is selected by the searcher as the search objective target subject. In addition, FIG. 15B shows an example of the search screen 80 in a case in which the searcher selects the plurality (two in FIG. 15B) of search objective target subjects. Specifically, FIG. 15B shows a state in which the "target subject A" and the "target subject B" are selected by the searcher as the search objective target subject. As described above, in the information processing apparatus 10 according to the present embodiment, a plurality of search objective target subjects can be set.

In addition, in each form described above, the form has been described in which the information processing apparatus 10 and the search server 12 are separate bodies, but the present disclosure is not limited to the present form, and a form may be adopted in which the information processing apparatus 10 and the search server 12 may be integrated into one apparatus. In other words, the information processing apparatus 10 may include the search engine 13. Alternatively, in the present embodiment, the information processing apparatus 10 receives the input of the searcher or performs display to the searcher, but the present disclosure is not limited to this. For example, a terminal apparatus operated by the searcher may receive the input of the search objective target or the search condition of the searcher, and the information processing apparatus 10 may receive the input information received by the terminal apparatus, via the network or the like. In addition, the information processing apparatus 10 does not include the display unit 28, the search result acquired by the search result acquisition unit 46 may be transmitted to the terminal apparatus including the display unit 28 via the network or the like, and the terminal apparatus that receives the search result may perform display to the searcher.

In addition, in the form described above, for example, as the hardware structures of the processing units that execute various types of processing, such as the attribute information setting unit 40, the search objective target reception unit 42, the search condition reception unit 44, the search history accumulation processing unit 45, the search result acquisition unit 46, and the display processing unit 48, the following various processors can be used. As described above, in addition to a CPU which is a general-purpose processor which executes software (program) and functions as various processing units, the various processors include a programmable logic device (PLD) which is a processor of which a circuit configuration can be changed after manufacture, such as a field programmable gate array (FPGA), and a dedicated electric circuit which is a processor having a circuit configuration which is designed for exclusive use in order to execute specific processing, such as an application specific integrated circuit (ASIC).

One processing unit may be configured by one of the various processors or may be configured by a combination of two or more processors of the same type or different types (for example, a combination of a plurality of FPGAs or a combination of a CPU and an FPGA). In addition, a plurality of the processing units may be configured by one processor.

As a first example of the configuration in which a plurality of processing units are configured by one processor, as represented by a computer, such as a client and a server, there is a form in which one processor is configured by a combination of one or more CPUs and software and the processor functions as the plurality of processing units. As a second example, as represented by a system on chip (SoC) or the like, there is a form in which a processor that realizes the function of the entire system including the plurality of processing units by one integrated circuit (IC) chip is used. As described above, various processing units are configured by one or more of the various processors as the hardware structures.

Further, more specifically, an electric circuit (circuitry) obtained by combining circuit elements, such as semiconductor elements, can be used as the hardware structures of the various processors.

In addition, in the embodiment described above, an aspect has been described in which the information processing program 23 is stored (installed) in the storage 22C of the storage unit 22 in advance, but the present disclosure is not limited to this. The information processing program 23 may be provided in a form of being recorded in a recording medium, such as a compact disc read only memory (CD-ROM), a digital versatile disc read only memory (DVD-ROM), and a universal serial bus (USB) memory. In addition, each information processing program 23 may be provided in a form being downloaded from an external device via a network. That is, the program described in the present embodiment (program product) may be provided in a form of the recording medium or in a form of being distributed from an external computer.

What is claimed is:

1. An information processing apparatus comprising:
at least one processor, wherein the processor:
receives a search objective target selected as a search objective from among a plurality of objective targets;
receives a search condition designated for the search objective target;
outputs a search result obtained by searching for a search target based on the search condition;
accumulates the search condition used for a search performed as the search objective target, as a search history, for each of the plurality of objective targets;
extracts related-search history that corresponds to the received search condition by vectorizing the accumulated plural search conditions included in the search history by natural language processing, and performs similarity analysis by comparing the vectors of the plural search conditions; and
specifies a second search condition from the extracted related-search history, and displays the search result that relates to the specified second search condition with a higher priority order.

2. The information processing apparatus according to claim 1, wherein the processor displays the search history of the received search objective target.

3. The information processing apparatus according to claim 1, wherein the processor:
acquires attribute information indicating an attribute of the objective target set for each objective target, and
outputs a search result obtained by searching for the search target based on a plurality of keywords corresponding to the attribute information and the search condition.

4. The information processing apparatus according to claim 3, wherein the plurality of keywords include a keyword specified from the attribute information and a keyword specified from the search condition.

5. The information processing apparatus according to claim 3, wherein the attribute information includes relationship information indicating a relationship among the plurality of objective targets.

6. The information processing apparatus according to claim 1, wherein the processor:
receives an objective target, which is selected by a searcher, other than the searcher as the search objective target, and
receives the search target designated for the search objective target by the searcher.

7. The information processing apparatus according to claim 1, wherein:
the objective target is a specific person, and
the objective target is at least one of a specific organism, a specific group, or a specific article.

8. The information processing apparatus according to claim 1, wherein the processor displays a plurality of input fields provided for the plurality of objective targets, respectively, and for a searcher to input the search condition.

9. The information processing apparatus according to claim 1, wherein the processor:
displays marks indicating the plurality of objective targets, and
receives a search objective target selected by a user designating the mark.

10. An information processing method executed by a processor of an information processing apparatus including at least one processor, the method comprising:
receiving a search objective target selected as a search objective from among a plurality of objective targets;
receiving a search condition designated for the search objective target;
outputting a search result obtained by searching for a search target based on the search condition;
accumulating the search condition used for a search performed as the search objective target, as a search history, for each of the plurality of objective targets;
extracting related-search history that corresponds to the received search condition by vectorizing the accumulated plural search conditions included in the search history by natural language processing, and performing similarity analysis by comparing the vectors of the plural search conditions; and
specifying a second search condition from the extracted related-search history, and displaying the search result that relates to the specified second search condition with a higher priority order.

11. A non-transitory computer readable medium storing an information processing program causing a processor of an information processing apparatus including at least one processor to execute:
receiving a search objective target selected as a search objective from among a plurality of objective targets;
receiving a search condition designated for the search objective target;
outputting a search result obtained by searching for a search target based on the search condition;
accumulating the search condition used for a search performed as the search objective target, as a search history, for each of the plurality of objective targets;
extracting related-search history that corresponds to the received search condition by vectorizing the accumulated plural search conditions included in the search history by natural language processing, and performing similarity analysis by comparing the vectors of the plural search conditions; and
specifying a second search condition from the extracted related-search history, and displaying the search result that relates to the specified second search condition with a higher priority order.

* * * * *